(12) United States Patent
Brandstrom

(10) Patent No.: US 8,673,101 B2
(45) Date of Patent: *Mar. 18, 2014

(54) FIBER REINFORCED REBAR WITH SHAPED SECTIONS

(71) Applicant: Randel Brandstrom, Edmonton (CA)

(72) Inventor: Randel Brandstrom, Edmonton (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/625,494

(22) Filed: Sep. 24, 2012

(65) Prior Publication Data

US 2013/0255867 A1   Oct. 3, 2013

Related U.S. Application Data

(63) Continuation of application No. 13/027,553, filed on Feb. 15, 2011, now Pat. No. 8,333,857.

(51) Int. Cl.
*B29C 53/58* (2006.01)

(52) U.S. Cl.
USPC .................. 156/173; 242/174; 242/160.1

(58) Field of Classification Search
USPC ............ 156/169, 173, 172; 242/169, 172; 52/125.4

See application file for complete search history.

(56) References Cited

U.S. PATENT DOCUMENTS

| | | | | |
|---|---|---|---|---|
| 3,793,108 A | * | 2/1974 | Goldsworthy | 156/180 |
| 4,394,338 A | * | 7/1983 | Fuwa | 264/135 |
| 4,445,957 A | | 5/1984 | Harvey | |
| 4,620,401 A | | 11/1986 | L'Esperance | |
| 4,659,071 A | * | 4/1987 | Woltron | 267/149 |
| 5,174,844 A | | 12/1992 | Tong | |
| 8,333,857 B2 | * | 12/2012 | Brandstrom | 156/173 |
| 2008/0261042 A1 | | 10/2008 | Brandstrom | |

FOREIGN PATENT DOCUMENTS

| | | |
|---|---|---|
| CA | 2396808 | 7/2001 |
| CA | 2666913 | 8/2009 |
| CA | 2731371 | 4/2011 |
| EP | 390468 | 5/1990 |
| JP | 1206022 | 8/1989 |
| JP | 11005257 | 1/1999 |
| KR | 20100025668 | 3/2010 |
| WO | 2004113638 | 12/2004 |
| WO | 2008028987 | 3/2008 |
| WO | 2010139045 | 12/2010 |

* cited by examiner

*Primary Examiner* — Katarzyna Wyrozebski Lee
*Assistant Examiner* — Vishal I Patel
(74) *Attorney, Agent, or Firm* — Adrian D. Battison; Ade & Company Inc.

(57) ABSTRACT

A composite reinforcing bar is formed by providing a reinforcing material supply of fiber strands ravings; a resin supply bath, and a puller for pulling the resin-impregnated reinforcing material through the resin bath. The material is wound on a helical holder, while the resin remains unset, rotated about its axis on a drive system so that the material is wrapped the holder which is indexed along it axis and removed when full for curing the resin on the holder while the body remains wrapped thereon. The bar is wrapped with the turns side by side and is then stretched out and held by longitudinal straight bars while the reinforcing structure so formed is embedded in a cast material.

21 Claims, 12 Drawing Sheets

FIBER REINFORCED REBAR WITH SHAPED SECTIONS

This application is a continuation in part of application Ser. No. 13/027553 filed Feb. 15, 2011 and now issued to U.S. Pat. No. 8,333,857.

The present invention relates a method for manufacture of fiber reinforced reinforcing bar or "rebar" where at least portions of the rebar along the length are curved or shaped out of the straight path of the bar.

The term "rebar" as used herein is intended to include bars and rods which are hollow, that is tubing. The outside surface is preferably but not necessarily of circular cross section. The rods can be of any length.

BACKGROUND OF THE INVENTION

The use of fiber reinforced plastics (FRP) rods in construction, marine, mining and others has been increasing for years. This is because FRP has many benefits, such as non-(chemical or saltwater) corroding, non-metallic (or non-magnetic) and non-conductive, about twice to three times tensile strength and ¼ weight of steel reinforcing rod, a co-efficient of thermal expansion more compatible with concrete or rock than steel rod. Most of the bars are often produced by pultrusion process and have a linear or uniform profile. Conventional pultrusion process involves drawing a bundle of reinforcing material (e.g., fibers or fiber filaments) from a source thereof, wetting the fibers and impregnating them (preferably with a thermo-settable polymer resin) by passing the reinforcing material through a resin bath in an open tank, pulling the resin-wetted and impregnated bundle through a shaping die to align the fiber bundle and to manipulate it into the proper cross sectional configuration, and curing the resin in a mold while maintaining tension on the filaments. Because the fibers progress completely through the pultrusion process without being cut or chopped, the resulting products generally have exceptionally high tensile strength in the longitudinal direction (i.e., in the direction the fiber filaments are pulled). Exemplary pultrusion techniques are described in U.S. Pat. No. 3,793,108 to Goldsworthy; U.S. Pat. No. 4,394,338 to Fuwa; U.S. Pat. No. 4,445,957 to Harvey; and U.S. Pat. No. 5,174,844 to Tong.

FRP uniform profile or linear rods offer several advantages in many industrial applications. The rods are corrosion resistant, and have high tensile strength and weight reduction. In the past, threaded steel rods or bolts had been widely used in engineering practice. However, long-term observations in Sweden of steel bolts grouted with mortar have shown that the quality of the grouting material was insufficient in 50% of the objects and more bolts have suffered from severe corrosion (see reference Hans K. Helfrich). In contrast with the steel bolts, the FRP bolts are corrosion resistant and can be simultaneously used in the temporary support and the final lining, and the construction costs of single lining tunnels with FRP rock bolts are 33% to 50% lower than of tunnels with traditional in-site concrete (see reference Amberg Ingenieurburo AG, Zurich). This FRP rock bolting system is durable and as a part of the final lining supports a structure during its whole life span. Furthermore, due to their seawater corrosion resistance, the FRP bolts and anchors are also proven as good solutions in waterfront (e.g., on-shore or off-shore seawalls) to reinforce the concrete structures. In general the fibreglass rod/bolt is already an important niche, and will be a more important product to the mining and construction industries. The critical needs of these industries are for structural reinforcements that provide long-term reliability that is of cost-effective. The savings in repair and maintenance to these industries will be significant, as the composite rebar will last almost indefinitely.

The mining industry requires composite rods for mining shafts or tunnel roof bolts. These rods are usually carried by hand and installed overhead in mining tunnel, so there is a benefit that the fibreglass rod is ¼ the weight and twice the strength of steel rebar which are widely used currently. Fibreglass rod also does not damage the mining equipment. In construction industries, such as bridges, roads, seawall and building structures, reinforcements of the steel rebar have been widely used and the most of steel rebars have been corroded after a few years of service life. Typically, the structures with the steel rebars are often torn down after a period of time. Therefore, the use of the corrosion resistant composite rebars have been increased for construction industries in recent years.

Conventional steel rebar can of course be bent to form hooks or loops or angled sections typically at the ends but also at other locations along the length of the bar. Such bends are often required for many purposes, such as for attachment of the bar to other components.

FRP rebar when formed from thermoset resin of course cannot be bent after the bar is formed. It has up to now been a significant outstanding problem as to how to form such bends in rebar using a thermoset resin in an effective and commercial manner where the bend sections are not so compromised as to their strength as to severely limit the use of the bar.

SUMMARY OF THE INVENTION

It is one object of the present invention to provide a method for forming fiber reinforced bars manufactured using a thermoset resin.

According to a first aspect of the invention there is provided a method of forming a bar comprising:

forming an elongate body from longitudinally extending components of reinforcing fibers with the components arranged generally longitudinal to the body which is fed forwardly along its length;

wherein the body comprises a series of inner longitudinally extending components of reinforcing fibers arranged longitudinal to the bar and at least one helical wrapping of at least one component wrapped around the inner longitudinally extending components;

wetting the elongate body with a unset curable resin permeated through the fibers of the components;

providing a holder for receiving a length of the elongate body;

while the resin remains unset, rotating the holder about an axis so as to wrap the body around the holder;

providing relative movement in a direction longitudinal of the axis of the holder between the body as it is fed forwardly and the holder so as to wrap the body around the holder at stepped positions along the holder;

and curing the resin of the body on the holder while the body remains wrapped thereon to form the bar from the cured body;

wherein the bar consists solely of the body when cured.

According to a second aspect of the invention there is provided a method of forming a helical reinforcing bar comprising:

forming an elongate body from longitudinally extending components of reinforcing fibers with the components arranged generally longitudinal to the body which is fed forwardly along its length;

wherein the body comprises a series of inner longitudinally extending components of reinforcing fibers arranged longitudinal to the bar and at least one helical wrapping of at least one component wrapped around the inner longitudinally extending components;

wetting the elongate body with a unset curable resin permeated through the fibers of the components;

providing a holder for receiving a length of the elongate body;

the holder including a continuous helical support channel arranged around a longitudinal axis of the holder;

while the resin remains unset, rotating the holder about the longitudinal axis so as to wrap the body around the holder and to lay the body into the continuous helical support channel;

providing relative movement in a direction longitudinal of the axis of the holder between the body as it is fed forwardly and the holder so as to wrap the body around the holder into the continuous helical support channel;

and curing the resin of the body on the holder while the body remains wrapped thereon to form the helical reinforcing bar from the cured body;

wherein the helical reinforcing bar consists solely of the body when cured.

Preferably the helical reinforcing bar is stretched longitudinally along the axis so as to increase the pitch thereof prior to embedding into a receiving material as a reinforcement therefor.

Preferably the stretched helical reinforcing bar is connected to longitudinal support bars to hold the helical reinforcing bar in the stretched position thereof.

Preferably the continuous helical support channel is arranged with a pitch substantially equal to a diameter of the body so that the turns of the body are laid side by side.

Preferably the wrapping is stopped when the holder is filled by side by side portions of the body arranged along the engagement members and the resin is cured after the wrapping is stopped. Preferably, to effect this separate curing, the holder is removed when the wrapping is stopped and the resin is cured with the holder removed. However curing may be effected on an ongoing process while the holder continues to rotate.

Preferably the relative movement between the body and the holder is obtained by indexing the holder along the axis. This can be carried out by moving the holder along a mounting on the drive system.

Preferably the holder has external rings which sit in a driving device.

Preferably the engagement members are arranged on the holder for adjustment of the positions thereof. In this way different dimensions of the straight portions and different angles of wrap can be achieved.

Preferably the holder is driven around the axis at an angular velocity which takes up the body at a constant linear velocity. That is the body is fed from a supply and is wound onto the holder at constant rate.

Preferably the step of forming the reinforcing bar includes providing a series of inner longitudinally extending components of reinforcing fibers arranged longitudinal to the bar and providing at least one wrapping of at least one component wrapped around the inner longitudinally extending components.

This wrapping can be part of the structure in that it is intended to remain in place after the roving is complete and is in use. In the alternative the wrapping can be provided for the purpose of maintaining the integrity of the structure during the winding around the bars for the bending process. In this case, the wrapping may have no structural contribution in the finished rebar and is used merely to keep the bundle together, or even the material can be removed and discarded as a sacrificial material after curing is complete. In some cases particles can be adhesively attached to the exterior surface of the rebar when complete for added bonding to the material in which the rebar is embedded.

Where the wrapping is structural, it is typically helical. However longitudinally extending wrapping materials can be used. That is the material can either wind around the bar or be simply clad over it.

Where the wrapping is helical, preferably the wrapping comprises first and second helical wrapping or wrappings in opposed direction of wrapping with the resin being permeated through both the inner longitudinally extending components and through the wrappings to form a structure integrated by the permeated resin.

Preferably the bar has an outer surface portion which extends along at least most of the length of the bar and at the outer surface portion, the inner rovings have parts thereof between the first and second wrapping or wrappings exposed and bulged outwardly by tension applied by the wrapping or wrappings during curing, the bulged parts defining components of the outer surface portion of the bar which are thus rough and exposed for engaging a material to be reinforced so as to transfer longitudinal loads between the material to be reinforced and the inner ravings.

While the inner components are preferably or typically rovings, other material can be used or various types known to person skilled in the art. The inner components are preferably but not necessarily wrapped in one or both directions. Again the wrappings are preferably or typically rovings, but other material such as mat or thread can be used or various types known to person skilled in the art.

The reinforcing structure so formed with a plurality of turns of the helical coil can be used in a method including casting a settable material around the helical reinforcing bar so as to bury the plurality of turns of the helical reinforcing bar in the cast material and causing the cast material to set.

The helical coils so formed can be used to reinforce generally cylindrical bodies such as pilings where the reinforcing coil is located around the outer periphery of the pile, or such as in cast pipe where the reinforcing coil is located in the wall of the cast pipe surrounding the hollow interior of the pipe.

DETAILED DESCRIPTION OF THE INVENTION

Figure 1:
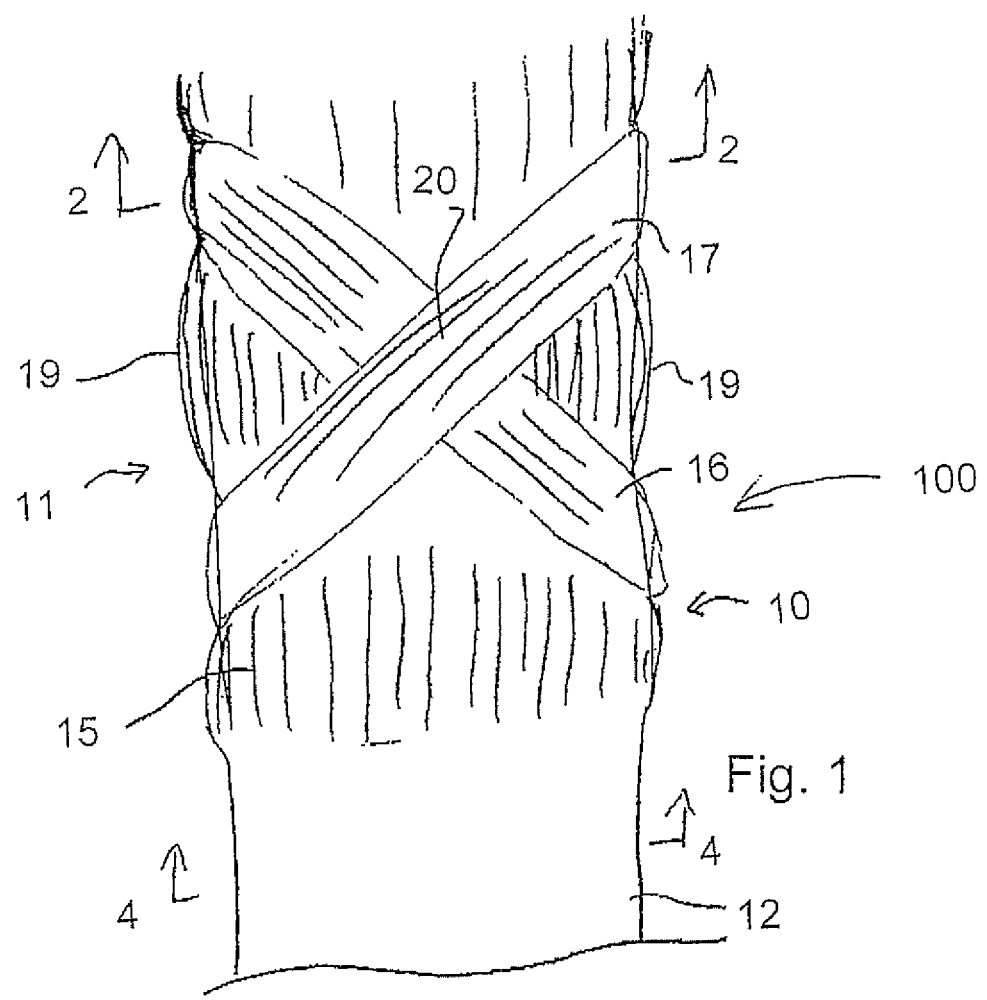
FIG. 1 is a side elevational view of a portion of a reinforcing bar manufactured by a method according to the present invention.
Figure 2:
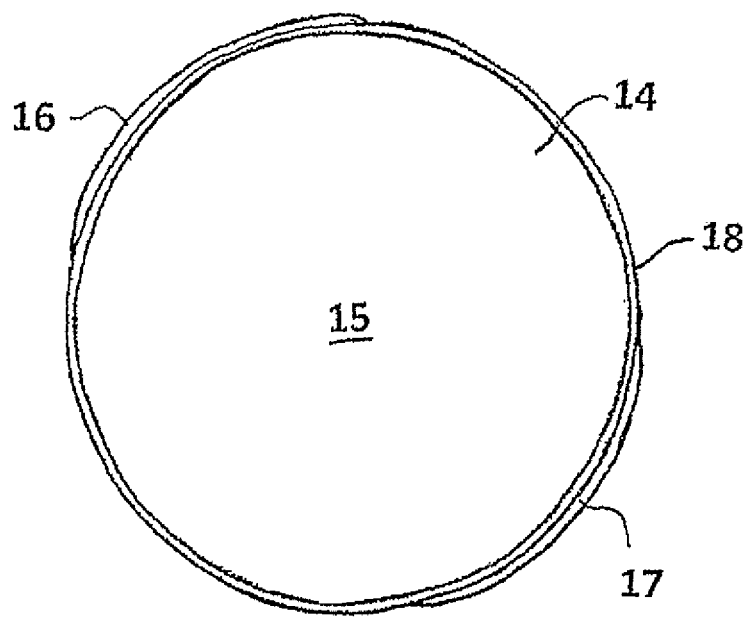
FIG. 2 is a cross sectional view along the lines 2-2 of FIG. 1.
Figure 3:
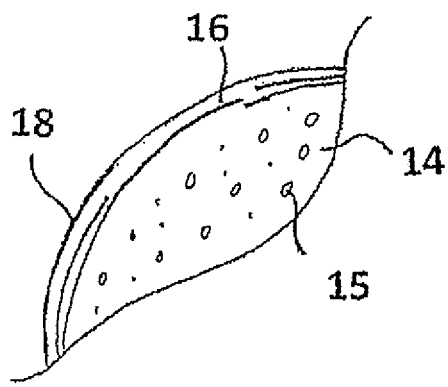
FIG. 3 is a cross sectional view similar to that of FIG. 2 on an enlarged scale.

In FIG. 1 is shown a reinforcing bar generally indicated at 10. This is formed using the method described in detail hereinafter to form a straight section 100.

The basic bar structure is formed using the method shown and described in published US application 2008/0261042 of the present applicants, the disclosure of which is repeated as follows for completeness.

The bar 10 has a first section 11 extending along most of the length of the bar together with a second section 12 which extends a part of the length of the bar. The bar is generally formed in continuous construction so that the first and second sections are repeated alternately. The length of the second section generally will comprise only a short portion relative to the length of the main section 1 so that for example the main section may be 12 feet long and the second section only 6" long.

The reinforcing bar is formed solely from a resin material 14 which is permeated through to sections of reinforcing fibers including longitudinal reinforcing fibers 15 and wrapping reinforcing fiber 16, 17.

The longitudinal reinforcing fibers 15 constitute the main volume of the structure so that typically the fiber content may be constituted as longitudinal fibers 90 to 97% and wrapping fibers 3 to 10%, where the resin content can be of the order of 20 to 30% by weight.

The structure in the area of the portion 11 is formed without any compression of any of the fibers by a pultrusion process. Thus neither the inner core formed by the longitudinal fibers 15 nor the outer wrapping 16 and 17 pass through a die structure so that they are free to take up their positions as determined by the tensions in the material when formed.

The resin may be a two part resin which sets without heat but more preferably is a thermosetting resin which is heated by any one of a number of available heating techniques such as microwave heating, forced air heating, infra-red heating, RF-heating, or induction heating where at least one metal fiber is included in the structure to absorb the electromagnetic energy. Thus the heat is applied to the structure to effect curing of the resin without contact by the heating device on the structure. In this way the fibers in the first section 11 are free to take up their position depending upon their tension and they take up a position within the resin so that the resin extends both through the longitudinal fibers and the wrapping fibers.

In order to obtain this situation where the resin 14 extends outwardly to the outer surface 18 and permeates through all of the fibers, the longitudinal fibers and the wrapping fibers are both preferably wetted preferably using a bath or dipping process so that the fibers are fully enveloped with the resin prior to entry into the forming system generally described above and shown in more detail in the above US patent of the present inventor, the disclosure which is incorporated herein by reference.

The wetting of the fibers ensures that the resin permeates through the whole structure of the outside surface 18.

The absence of any compression by the provision of any form of die through which the core of longitudinal fibers passes ensures that the wrapping fibers 16 and 17 apply pressure onto those parts of the longitudinal fibers which are contacted by the wrapping fibers squeezing those longitudinal fibers inwardly and causing bulging of the longitudinal fibers in the sections 19. Thus between each wrapped strip of fibers there is a portion of the longitudinal fibers which is squeezed and bulged outwardly so that it projects to a position which is preferably slightly proud of the outside surface of the wrapping fibers.

The wrapping fibers are of course spaced in the longitudinal direction by a helical wrapping action so that the width of the wrapping fibers is less than the width of the bulged intermediate sections 19.

Typically the wrapping fibers in each direction can be spaced of the order of 1 to 3 to the inch. However a wider or lesser spacing may be used provided the longitudinal fiber are properly controlled and provided there is enough space to ensure bulging between the wraps.

The wrapping fibers may be wrapped as a single roving in a single start wrapping process or as multiple rovings applied in a multi-start wrapping process. In such a multi start process the number of ravings side by side may be in the range 3 to 10. The number of rovings or the thickness of the roving at the wrapping position may vary depending on the diameter of the core.

The wrapping action occurs in both directions so that the wrapping fibers overlap one another as they cross as shown for example at 20. In this way the bulged sections are generally diamond shape in front elevation and are squeezed at the top and bottom by the wrapping action of the wrapping fibers. Thus the bulging sections 19 are individual and separated by the wrapping fibers and yet the longitudinal fibers are properly contained and held into the structure by the wrapping at top and bottom of the bulging sections.

The provision of the wrapping or wrappings symmetrically in both directions tends to contain and locate the inner longitudinal rovings and maintain them in the longitudinal direction even when tension is applied. Thus the full strength of the longitudinal fibers in the longitudinal direction is maintained and is not reduced or compromised by any tendency of the longitudinal fibers to twist. Any such twisting of the longitudinal fibers can significantly reduce strength by applying loads sequentially to different fibers leading to sequential failure. In addition the wrappings in opposite directions accommodate torque applied to the rod in both directions.

The bulging sections 19 are thus presented on the outside surface 18 for engagement with material within which the bar is embedded. Thus if the material to be reinforced is concrete, the concrete sets around the reinforcing bar and engages the bulging sections 19. Longitudinal loads from the concrete to the reinforcing bar are therefore transferred to the bulging sections 19 and not only to the wrapping section 16 and 17. The wrapping sections because of their angle to the longitudinal direction have less ability to accommodate longitudinal tension than do the longitudinal fibers which are longitudinal and continuous. Thus transferring the loads in the longitudinal direction to the bulged sections 19 ensures that the loads are transferred into the longitudinal fibers and avoid transference to elements which can be moved longitudinally or stripped from the outside surface 18. The bulge sections 19 cannot of course move longitudinally since they are part of longitudinal fibers.

Yet the outside surface thus can be free from additional bonded projecting elements such as grit or sand which is commonly applied to the outside surface of such reinforcing bars.

The fact that the resin is permeated throughout both the longitudinal fibers and the wrapping fibers to the outside surface 18 ensures that the wrapping fibers are bonded effectively into the structure.

Figure 4:
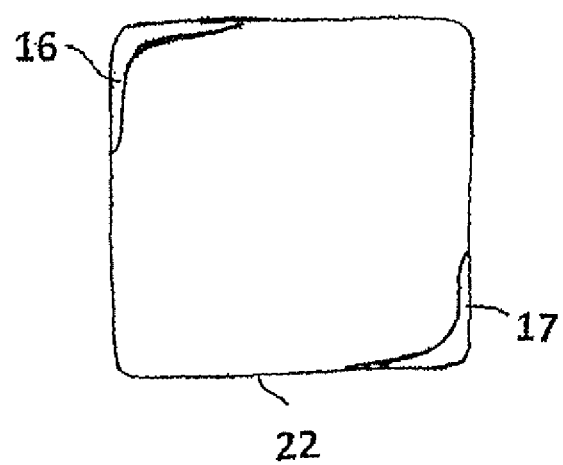
FIG. 4 is a cross sectional view along the lines 4-4 of FIG. 1.

The second section 12 is formed periodically along the bar as it is formed by clamping the portion of the bar within a clamping die. The clamping die may move with the structure as it moves forwardly or the movement could be halted while the clamping action occurs and the curing occurs in the clamped position. Generally the formation of the clamped section occurs before the remainder of the bar moves into the heating section to complete the curing action. The clamping die has an inside surface which is shaped to a polygonal shape such as square and squeezes both the wrapping fibers and the longitudinal fibers to form them into the required outer shape 22 as shown in FIG. 4. The clamping action squeezes the fibers together and may reduce the cross sectional area due to squeezing of the resin from the structure. The longitudinal fibers extend through the clamp section and also the wrapping fibers extend through the clamp section as shown in FIG. 4. Thus the wrapping fibers in both directions of wrap are clamped into the structure at the polygonal second section 12.

As an alternative to the polygonal shape, any other non-circular shape may be used such as a compressed flat shape.

As a further alternative the rough rebar may be formed with a hole through the fibers to provide a connection for an anchor.

The second section 12 is thus shaped so that the bar can be grasped by a chuck or other clamping element so that the bar can be rotated around its axis during insulation of the bar in particular circumstances. The wrapping of the fibers 16 and 17 ensures that rotation at the second section 12 is transmitted into torque throughout the length of the bar by those wrapped section 16 and 17.

In one example of use of an arrangement of this type, the bar can be inserted into a drilled hole in rock in a mining situation and the drilled hole filled with a suitable resin. The stirring action in the resin caused by the rotation of the bar grasping the second section 12 and rotating the first section 11 causes the resin to be spread through the hole around the periphery in an effective stirring action caused by the bulged sections 19. Thus the bar can be bonded into place within the drilled hole to act as reinforcement for mining structures at for example the roof area of a mine.

In another alternative use of reinforcing bars of this type, a drill tip can be attached at one section 12 and the bar grasped at another section 12 allowing the bar to be rotated with the drill tip causing a drilling action driving the bar directly into a drilled hole while the bar causes the drilling of the hole. The bar can then remain in place and the drill tip selected be of a sufficiently disposable type so that it can be discarded within the hole.

Again the direct connection between the polygonal section 12 and the main portion of the bar caused by the presence of the wrapping fibers 16 and 17 within the resin allows the transfer of loads between the polygonal section and the main section 11.

The arrangement described herein has been found to be significantly advantageous in that it provides an improved embedment strength which is a factor used in calculating parameters for reinforcing bars in concrete. Thus the shape of the outer surface (wrappings in both directions, bulging of the longitudinal strands) provides a higher degree of attachment with the adhering material (concrete or epoxy resin). This higher mechanical bond translates into a high embedment strength.

The arrangement described herein has been found to be significantly advantageous in that it provides an improved control of crack width. Measurement of crack width is another factor used in calculating parameters for reinforcing bars in concrete with the intention of maintaining a low crack width factor. When designing for crack control reinforcement, the nature of this product and its high embedment strength will allow for a smaller bond dependant co-efficient to be used (for example, sand coated bars use 0.8, and a smooth pultruded bar would be higher). A lower bond dependant co-efficient translates into smaller crack widths, or less reinforcement required for the same crack width.

In FIGS. 5 to 8 is shown the method for manufacturing the rebar having the straight portion 100 and the bend portion 101. This method includes a conventional system 20 for forming an elongate body 23 from rovings of reinforcing fibers arranged generally longitudinal to the body which is fed forwardly along its length from a supply assembly 21. The body 23 is wetted with a unset curable resin permeated through the rovings in a bath 22. The body 23 is fed forwardly by a drive and guide system 23A and is fed from this system at a predetermined speed either by being driven forwardly or more generally by controlling the feed from the supply 21 to ensure constant supply in order to try to maintain a predetermined tension, bearing in mind that the speed may be varied depending on various factors.

The body 23 is fed from the former 22 to a holder or reel 24 for receiving a length of the elongate body mounted on a drive system 25 for rotation about an axis. The holder comprises generally a reel 26 with a plurality of bars 27 arranged at spaced positions around the axis of the reel.

Thus the holder comprises a hub 28 including a plurality of transverse rails 30 extending outwardly for supporting the bars 27 at positions spaced outwardly or the axis of the hub. The rails 30 support a plurality of the engagement members or bars 27 at spaced positions around the axis 31A with each bar parallel to the axis.

Each bar 27 is generally cylindrical with an outer surface 33 for receiving the rebar body 23 to be wrapped around the reel. Each bar 27 has on its outer surface a series of axially spaced grooves 34 with each groove 34 having a radius of curvature and a width arranged to match the outer periphery of the rebar body 23. Thus as the reel is rotated about its axis, the rebar body is laid into each groove 34 in turn along the bars 27 with the grooves holding the rebar body at a specific position on the bar 27 and spaced from the next wrapping of the rebar body. Thus there is no contact between each wrap and the next. In order to maintain the rebar body confined into a generally cylindrical shape, at least one wrapping of at least one component is wrapped around the inner rovings.

This wrapping can be part of the structure in that it is intended to remain in place after the roving is complete and is in use. In the alternative the wrapping can be provided for the purpose of maintaining the integrity of the structure during the winding around the bars for the bending process. In this case, the wrapping may have no structural contribution in the finished rebar and is used merely to keep the bundle together, or even the material can be removed and discarded as a sacrificial material after curing is complete. In some cases particles can be adhesively attached to the exterior surface of the rebar when complete for added bonding to the material in which the rebar is embedded.

Where the wrapping is structural, it is typically helical. However longitudinally extending wrapping materials can be used. That is the material can either wind around the bar or be simply clad over it.

Figure 6:
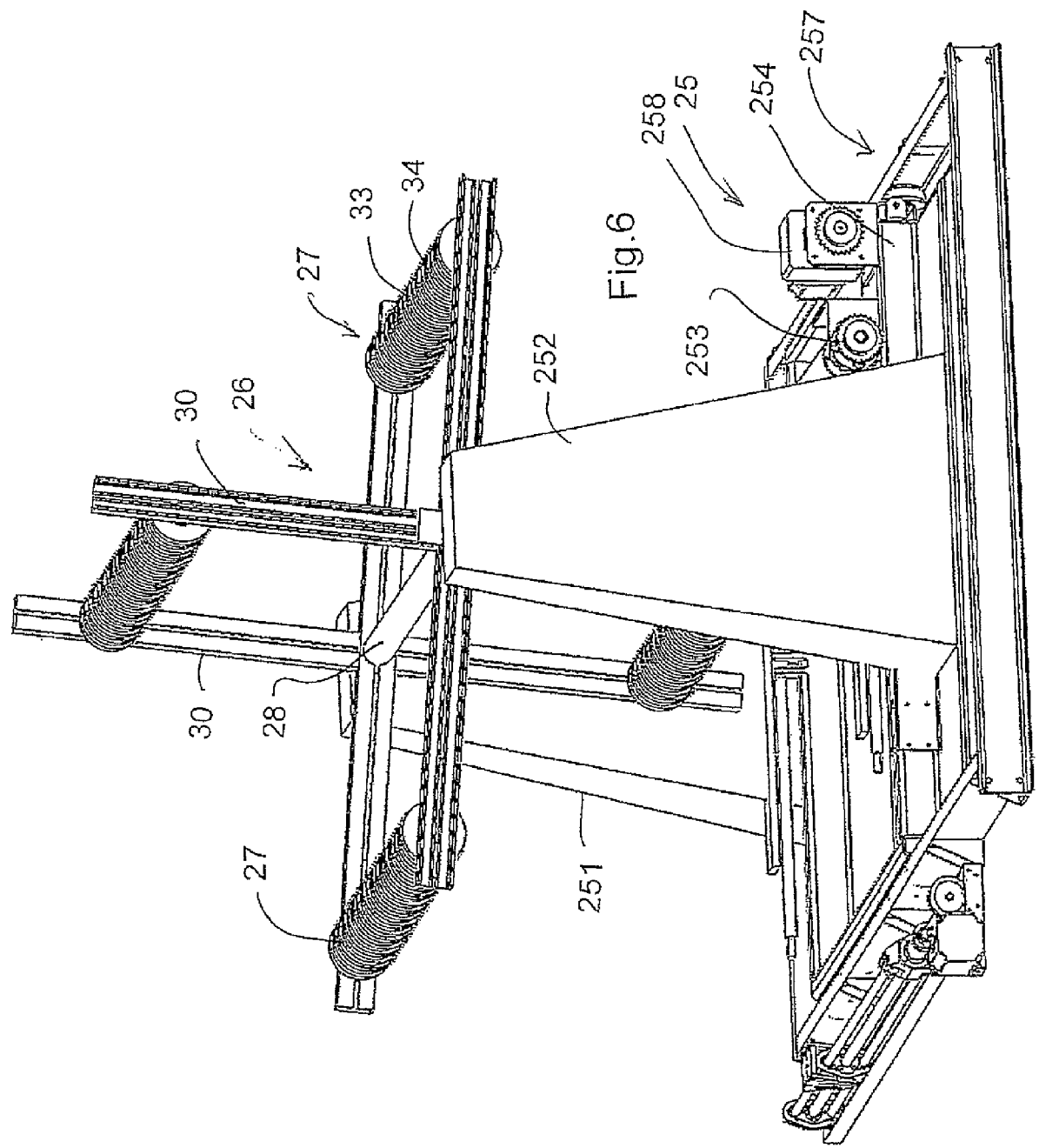
FIG. 6 is an isometric view of the holder and drive system of FIG. 5.
Figure 7:
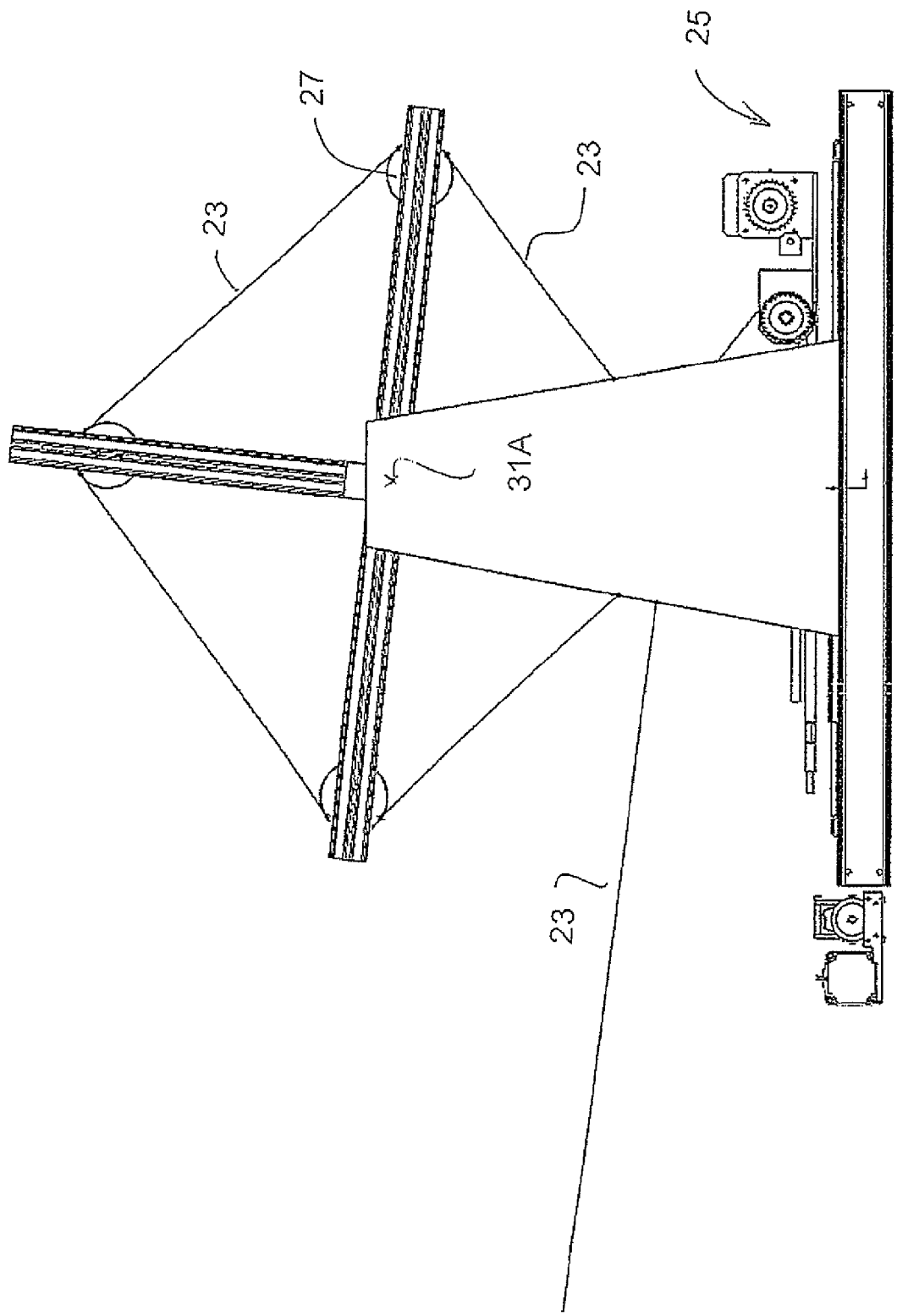
FIG. 7 is a side elevational view of the holder and drive system of FIG. 5.

The bars 27 have a radius of curvature around the bar arranged to receive and to form a respective bent portion of the body. Thus in the figures where the bars 27 are shown as cylindrical, the radius of curvature of the cylinder matches the intended curvature of the required bent portion to be formed. It will be appreciated that the bar 27 only contacts the rebar body over a portion of the periphery of its outer surface 33 which will be roughly 90 degrees in the arrangement using four bars as shown in FIG. 6. This portion of the surface 33 must match the shape of the bent portion to be formed. The remaining part of the bar around the remaining 270 degrees can be of any shape since it has no contact with the rebar body 23.

While the resin remains unset, the body is wrapped around the holder such that the fed length of the body is wrapped from one engagement member to a next engagement member such that bent portions of the body are wrapped partly around each engagement member and straight portions of the body extend between each engagement member and the next. Thus each engagement member has angularly extending axially separated surface portions which are shaped to mold the bent portions to a required bent shape. The drive system 25 provides both rotation of the reel by driving the hub 28 around the axis 31A but also provides relative movement between the rebar body 23 as it is fed forwardly and the holder 24 so as to wrap the body 23 around the bars 27 of the holder at the stepped positions along the bars 27 defined by the grooves 34.

Figure 8:
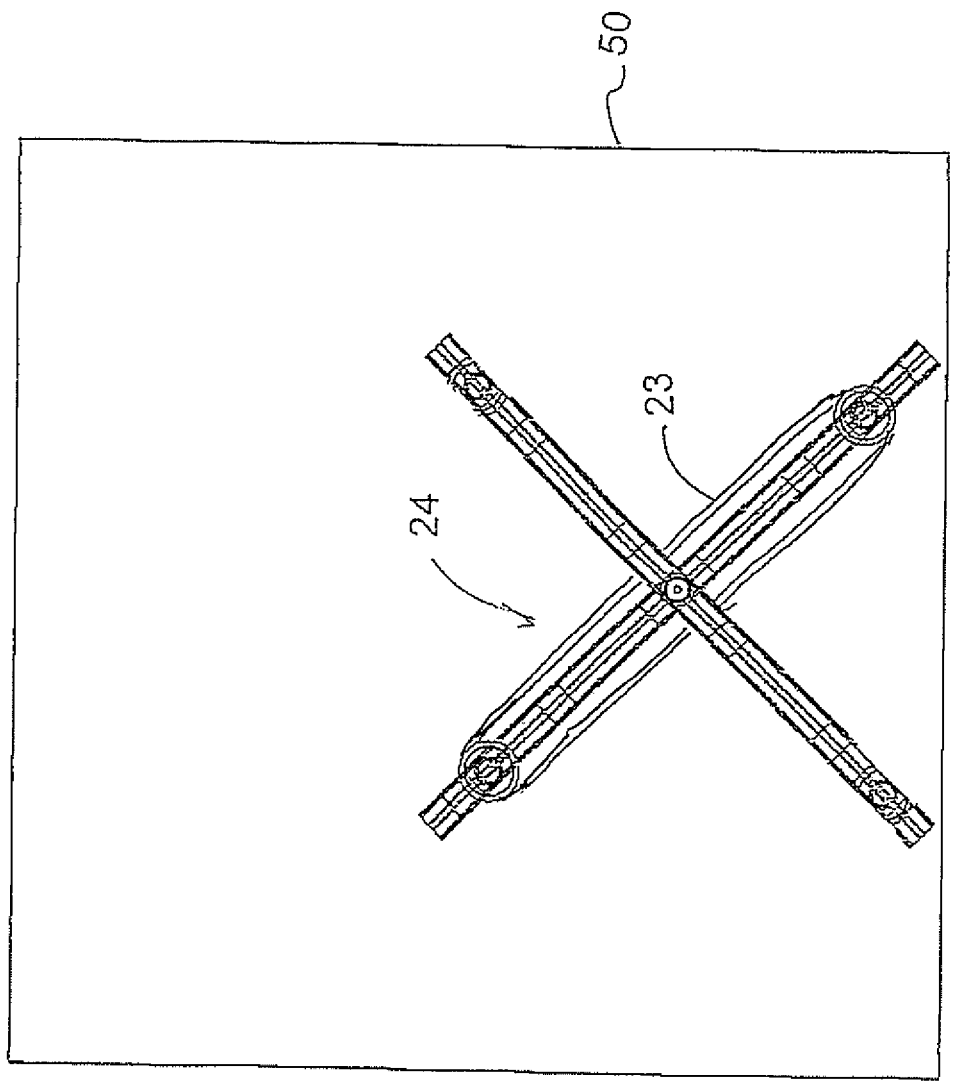
FIG. 8 is side elevational view of the holder of FIG. 5 removed for curing.

As shown in FIG. 8, the holder when filled, that is each of the grooves 34 has been engaged by a portion of the rebar body, the resin in the rebar body is cured on the holder while the body 23 remains wrapped on the holder. That is the wrapping is stopped when the holder is filled by side by side portions of the body arranged along the engagement members and the resin is cured after the wrapping is stopped and the holder removed and placed in a suitable oven 50 or other heating system.

It will be appreciated that each bar 27 is spaced from the next by a distance so as to define a required length between each bent portion and the next. For this reason the position of the bars 27 along the rails 30 is adjustable for example by defining a guide track and locking system which allows the bars to slide inwardly while being set at the required position parallel to the axis 31A.

The drive system 25 includes towers 251 and 252 for supporting respective ends of the hub 28, or the hub may be cantilevered from one tower. The hub is driven by a drive train 253 mounted on a base frame 254 The relative movement between the rebar body 23 and the holder 24 is obtained by guiding the rebar body 23 at a fixed feed position defined by the drive and guide system 23A and by indexing the holder 24 along the axis 31A. The indexing movement is obtained, as shown in FIG. 6, by moving the frame 254 carrying the hub 28 along an outer support frame 257 by an indexing motor 258 including a suitable drive system which may be a worm, chain or rack or other mechanical drive system. The indexing movement across the frame 257 can be constant or can be stepped as required, bearing in mind that the rebar body is laid into grooves and thus held and guided by those grooves to be properly positioned on the holder at the axially spaced locations defined by the grooves. The holder is thus driven around the axis with constant torque for applying constant tension to the rebar body 23. In order to obtain constant linear wind-up speed, the angular velocity of the hub 28 and therefore the bars 27 around the axis must change at different angular positions around the axis as the radial position of the winding location on the respective bar changes inwardly and outwardly of the axis.

When filled, the holder can be simply removed from the drive system by removing the hub from the towers and moving away the holder to the oven 50 (FIG. 8). The holder can then be replaced by a second empty holder of a set of holders of a suitable number to allow continuous production where the filled holders are in curing while another empty holder is in winding.

The holders can be of various diameters allowing various locations of the bars 27. For example a reel can have a diameter as much as 25 feet with many different locations of the bars being possible to provide many different numbers and locations of the bars for different angles of wrap for the bent portions and different lengths of straight portions. Typically the rebar body is bent at a radius of curvature which is matched to the diameter of the rebar body so that the outside surface 33 of the bars 27 is typically always the same diameter regardless of the angle of wrap. This diameter of the surface of the bar is of course matched to the width of the grooves for the diameter of rebar being formed. Different reels are therefore provided for different diameter rebar such as 0.5 inch, 1.0 inch or 1.5 inch and that reel can carry out all required shapes for the dedicated rebar diameter to which it is designed.

In FIG. 8, the holder is arranged such that the number of engagement members is changed. That is two of the bars 27 are removed leaving only two bars allowing a wrapping around each bar of 180 degrees.

Figure 9:
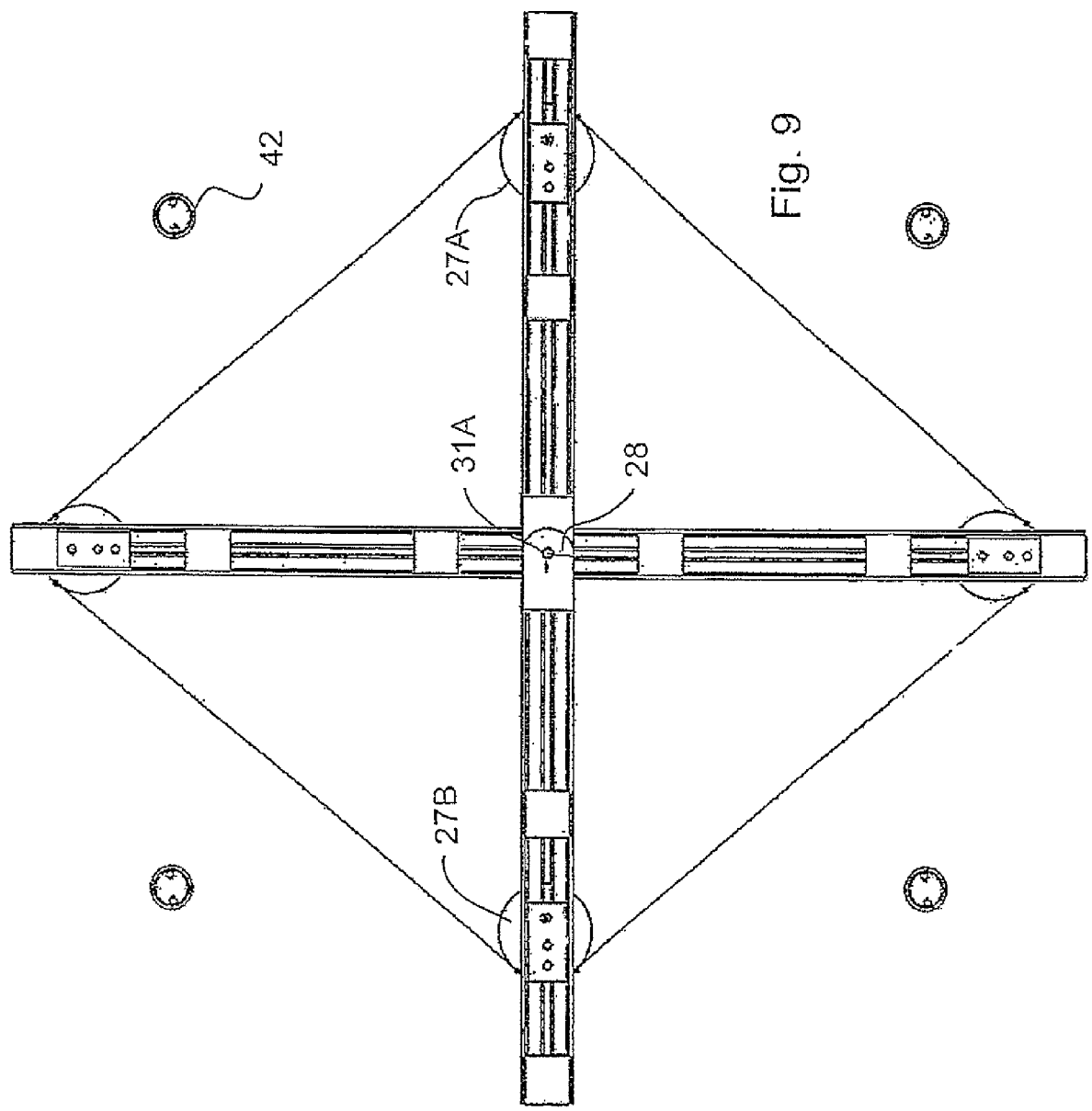
FIGS. 9 and 10 are side elevational views of the holder of FIG. 5 modified to include a reduced number of engagement bars and modified to show an optional method of forming additional curved sections in an opposed angular direction.
Figure 10:
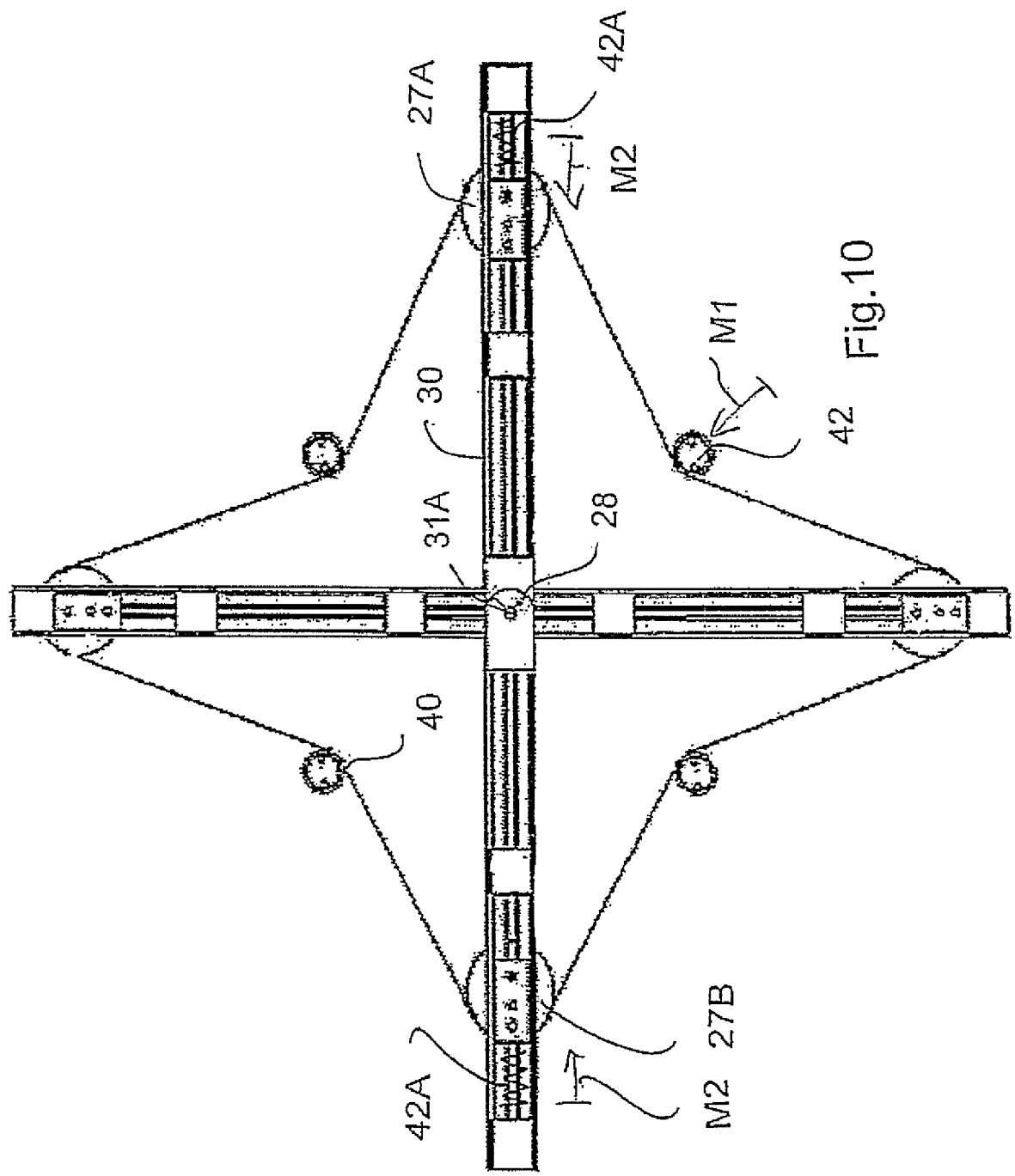

In FIGS. 9 and 10 is shown a method for bending the rebar body 23 at second bend positions 40 in an inverse direction to form second bent portions 41 having angles curved in opposite directions to the bent portions formed by the bars 27.

Thus, as shown in FIG. 9, the rebar body 23 is wrapped around the bars of the reel 26 firstly in the same manner as described above. When this wrapping is complete and the reel ready to be removed, or after the reel has been removed, the second bent portions are formed by inserting second engagement members or bars 42 onto the reel and by moving them inwardly toward the axis 31A at positions between the bars 27. Thus in FIGS. 9 and 10 there are shown four bars 27 at equiangular spacing and four bars 42 also at equiangular spacing located directly between the bars 27. However the number and angular spacings of the bars 27 and 42 can be varied as required. The original wrapping takes place with the bars 42 removed. The bars 42 are then applied onto the reel and the inward movement M1 of the bars 42 as shown in FIG. 10 pulls the rebar body 23 inwardly and thus requires inward movement of the bars 27A and 27B toward the axis 31A in movement M2 to accommodate this movement to release lengths of the body 23 to engage the second bars 42. The inward movement of the bars 27 can be controlled automatically using springs 42A to accommodate this movement. In this way, various different designs of bent rebar can be formed with bends at different locations and spacings, bends of different angles of wrap, and bends of different directions depending on the requirements of customer.

After the curing is complete in the oven 50, the wrapped lengths extending around the bars 27 are cut at required positions on the bars depending on the shape required. Thus in one example, the body 23 is cut at one bent portion on one side of the bar 27 to form a series of lengths of the body 23 each having one straight portion extending from the bar to the next bar and one bent portion wrapped around the bar. In this way a series of required rebar portions are formed by cutting along the length of each bar 27.

In another example, the body 23 is cut to form a u-shape rebar with two straight portions and one bent portion of 180 degrees between the two straight portions. This is obtained by using only two bars 27 on the reel and by cutting at a positions equidistantly spaced between the bars 27.

However these are only examples and many different shapes and arrangements can be designed and formed using this system.

Figure 11:
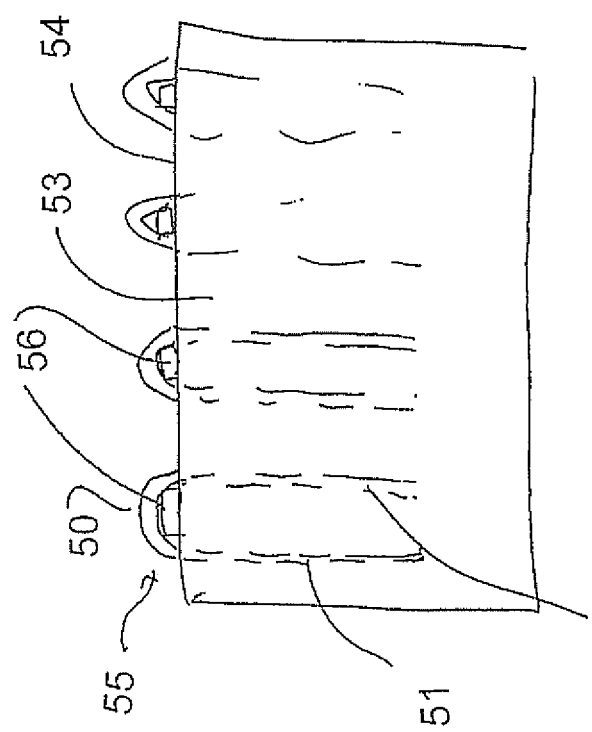
FIG. 11 is a side elevational view of a concrete panel formed using the rebars manufactured by the holder of FIG. 8.

In particular, the u-shape rebar 55 is shown in FIG. 11 where the base of the U is shown at 50 and the legs are shown at 51 and 52. This u-shape rebar 55 is cast in a concrete panel 53 with the straight portions 51 and 52 within the panel and the bent portion at the U 50 exposed at one edge 54 of the panel to form a lifting loop. The loops 50 thus form a row of lifting loops at the edge 54 which can be engaged by the bars 56 of a lifting system to simultaneously lift all loops to lift and carry the panel into a required position. The loops are then cut simply off after the panel is lifted into a required location.

As explained previously and shown in FIG. 1, the step of forming the reinforcing bar includes providing a series of inner rovings of reinforcing fibers arranged longitudinal to the bar, providing a first helical wrapping or wrappings of at least one roving wrapped around the inner rovings in a first direction of wrapping, and providing a second helical wrapping or wrappings of at least one roving wrapped around the inner rovings in a second opposed direction of wrapping with the resin being permeated through both the inner ravings and through the wrappings to form a structure integrated by the permeated resin.

The bar thus has an outer surface portion which extends along at least most of the length of the bar and at the outer surface portion, the inner rovings have parts thereof between the first and second wrapping or wrappings exposed and bulged outwardly by tension applied by the wrapping or wrappings during curing, the bulged parts defining components of the outer surface portion of the bar which are thus rough and exposed for engaging a material to be reinforced so as to transfer longitudinal loads between the material to be reinforced and the inner ravings.

While the inner components are preferably or typically rovings, other material can be used or various types known to person skilled in the art. The inner components are preferably but not necessarily wrapped in one or both directions. Again the wrappings are preferably or typically rovings, but other material such as mat or thread can be used or various types known to person skilled in the art.

Figure 12:
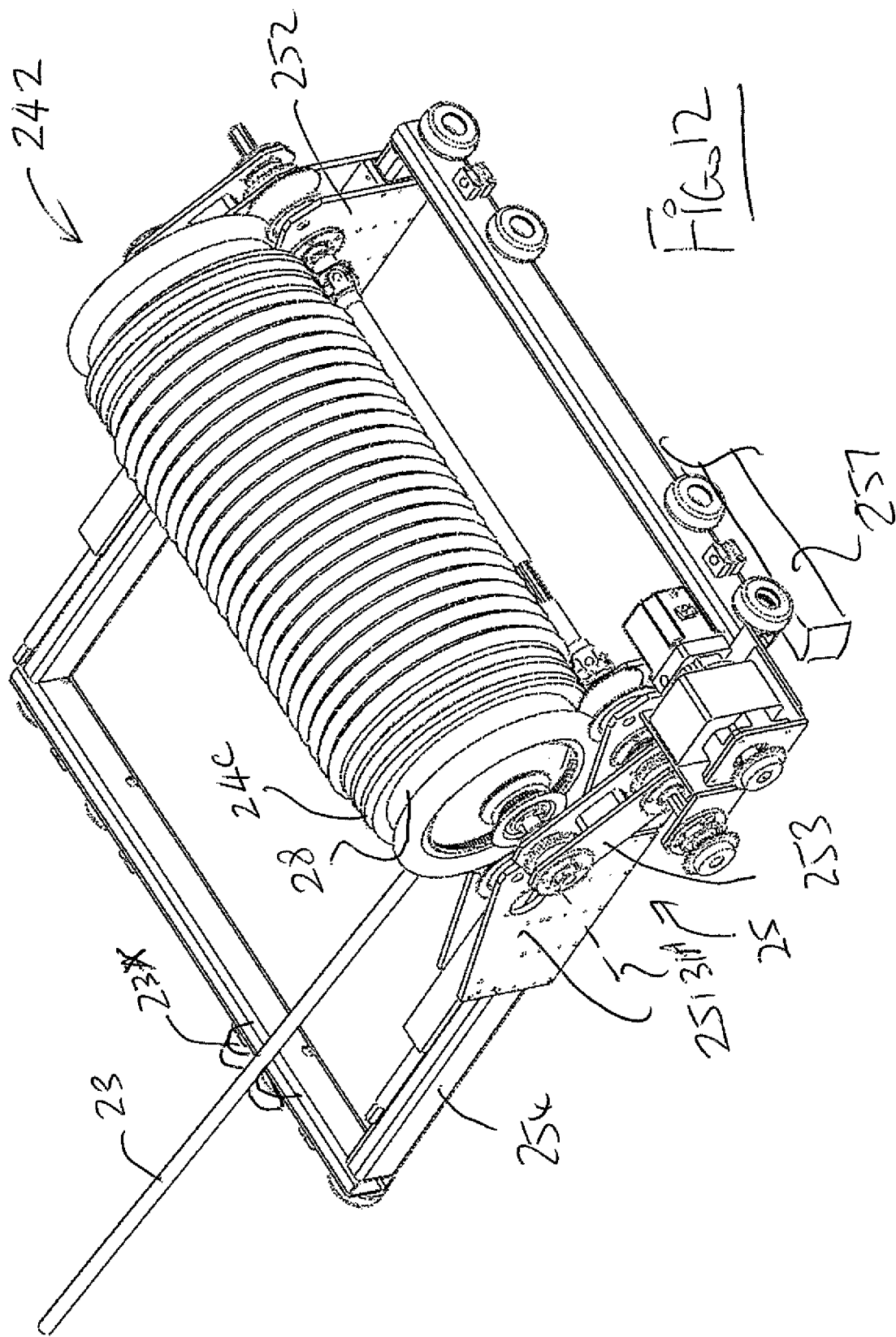
FIG. 12 is an isometric view of a replacement holder for use in the method of FIG. 5 for forming helical coiled reinforcing bar.
Figure 13:
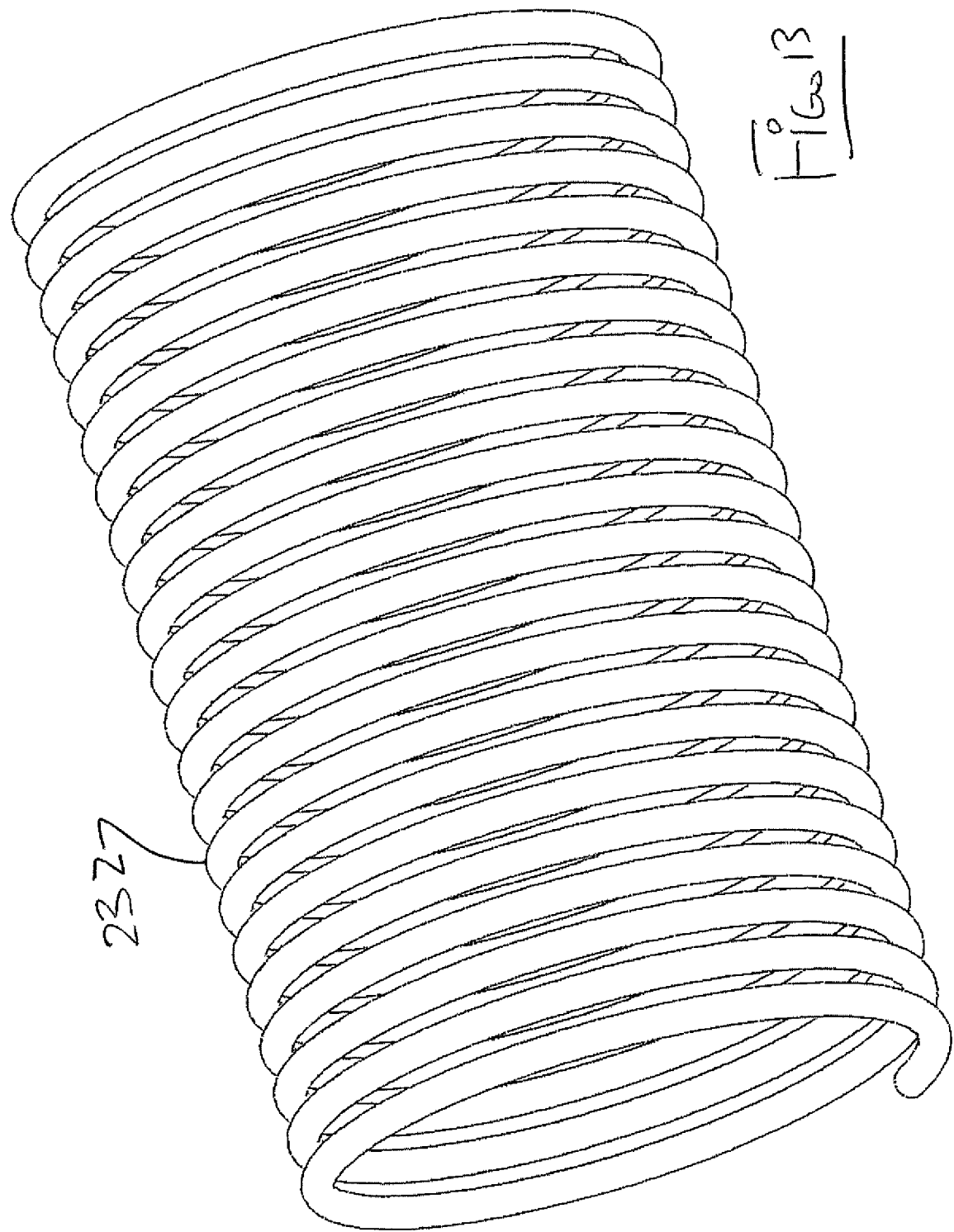
FIG. 13 is an isometric view of the helical coil when formed.
Figure 14:
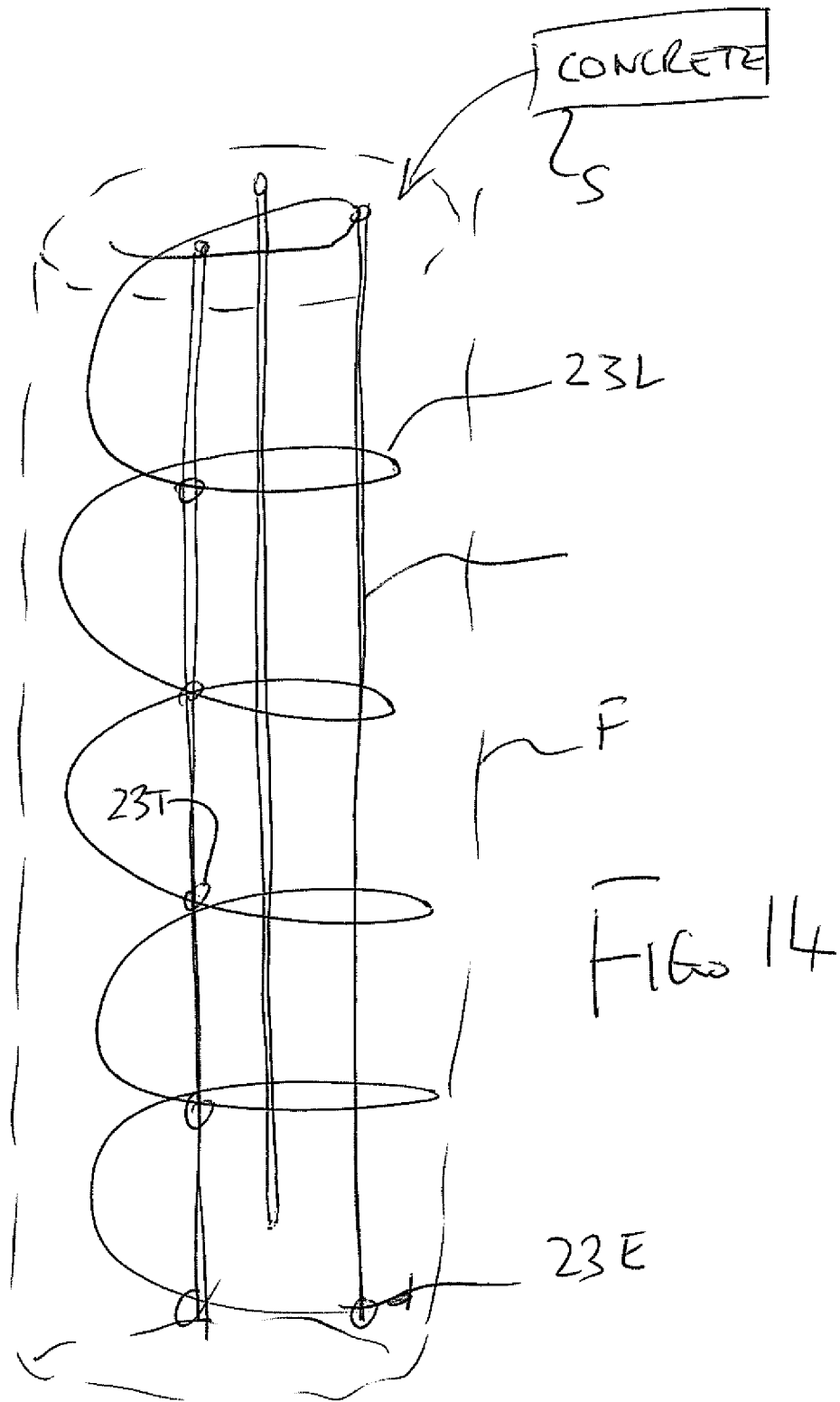
FIG. 14 is an isometric view of a reinforcing structure formed using the helical coil of FIG. 12 when formed and used in a method of reinforcing a cast structure.

Turning now to the method of forming a helical reinforcing bar shown in FIGS. 12, 13 and 14, there is shown an alternative arrangement of the holder or reel 24. Thus the body 23 is fed from the former 22 to the holder or reel 242 for receiving a length of the elongate body mounted on a drive system 25 for rotation about an axis.

In this embodiment the elongate body 23 is laid into a channel wound around the hub 28 to form a helical guide groove 24G which is continuous along the hub and is laid at a constant pitch.

The drive system 25 includes towers 251 and 252 for supporting respective ends of the hub 28, or the hub may be cantilevered from one tower. The hub is driven by a drive train 253 mounted on a base frame 254 The relative movement between the rebar body 23 and the holder 24 is obtained by guiding the rebar body 23 at a fixed feed position 23X defined by the drive and guide system 23A and by indexing the holder 242 along the axis 31A. The indexing movement is obtained by moving the frame 254 carrying the hub 28 along an outer support frame 257 by motor and mechanical drive system (not shown). The indexing movement across the frame 257 forms a helix of constant pitch, bearing in mind that the rebar body is laid into the constant helical guide groove 24G and thus is held and guided by the groove to be properly positioned on the holder at the helical position defined by the grooves. The holder is thus driven around the axis at constant velocity and thus with constant torque for applying constant tension to the rebar body 23.

While the resin remains unset, the body is wrapped around the holder such that the fed length of the body is wrapped into the helical groove which is shaped to mold the body 23 to the required helical shape. The drive system 25 provides both rotation of the reel by driving the hub 28 around the axis 31A but also provides relative movement between the rebar body 23 and the holder 24 as it is fed forwardly so as to wrap the body 23 around the guide of the holder.

Thus the body 23 provides an elongate body from longitudinally extending components of reinforcing fibers with the components arranged generally longitudinal to the body and the body 23 is fed forwardly along its length at the guide 23X.

As previously explained, the body comprises a series of inner longitudinally extending components of reinforcing fibers arranged longitudinal to the bar and at least one helical wrapping of at least one component wrapped around the inner longitudinally extending components.

Figure 5:
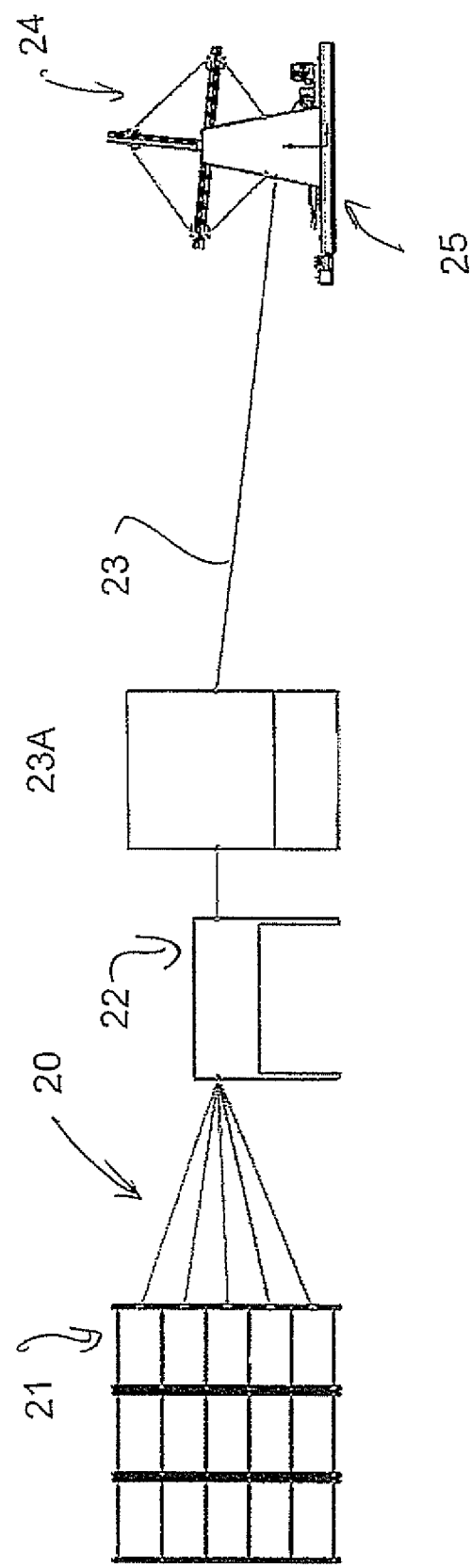
FIG. 5 is a schematic side elevational view of the method of forming the reinforcing bar of FIG. 1.

As previously explained and shown in FIG. 5, the elongate body is wetted with a unset curable resin permeated through the fibers of the components.

The holder 242 for receiving a length of the elongate body includes a continuous helical support channel arranged around a longitudinal axis of the holder to hold the body 23 in the helical condition while the resin remains unset and the holder is rotated about the longitudinal axis so as to wrap the body around the holder and to lay the body into the continuous helical support channel 24C. The continuous helical support channel 24C is arranged with a pitch substantially equal to a diameter of the body so that the turns of the body are laid substantially directly side by side with merely sufficient room for clearance to prevent bonding of one turn to the next during curing. The side by side location of the turns reduces the length required of the holder to the minimum.

The relative movement in a direction longitudinal of the axis of the holder between the body as it is fed forwardly and the holder so as to wrap the body around the holder into the continuous helical support channel is provided by the frame 257 and the drive (not shown).

The resin of the body is cured on the holder while the body remains wrapped thereon to form the helical reinforcing bar from the cured body. The helical reinforcing bar consists solely of the body when cured so that no additional material is added and the body laid on the holder is simply cured. For this purpose the holder is removed to a separate location where heat can be applied to effect the curing. While this occurs a new holder is applied to the support frame for continuation of the winding action.

As shown in FIG. 13, the helical reinforcing bar formed on the holder is removed to form a plurality of turns of the helical coil 23Z which retains its helical shape due to the set resin with the turns side by side. Depending upon the number of turns required in a finished reinforcing structure, the coil so formed can retain all of the turns or can be cut to a required length at a cut end 23E so as to provide a coil including the required number of turns.

As shown in FIG. 14, the helical reinforcing coil 23Z is stretched longitudinally along the axis so as to increase the pitch thereof and the stretched helical reinforcing coil 23Z is connected to longitudinal support bars 23L by ties 23T to hold the helical reinforcing bar in the stretched position thereof.

The process is completed by casting a settable material from a supply S for example of concrete around the helical reinforcing bar in a form F so as to bury the reinforcing structure so formed with the plurality of turns of the helical reinforcing bar in the cast material within the form F.

The invention claimed is:

1. A method of reinforcing a cast material comprising:
   forming a reinforcing bar which is wrapped around an axis to provide a plurality of turns by a method comprising:
   forming an elongate body from longitudinally extending components of reinforcing fibers with the components arranged generally longitudinal to the body which is fed forwardly along its length;
   wherein the body comprises a series of inner longitudinally extending components of reinforcing fibers arranged longitudinal to the bar and at least one helical wrapping of at least one component wrapped around the inner longitudinally extending components;
   wetting the elongate body with a unset curable resin permeated through the fibers of the components;
   providing a holder for receiving a length of the elongate body;
   while the resin remains unset, rotating the holder about an axis so as to wrap the body around the holder;
   providing relative movement in a direction longitudinal of the axis of the holder between the body as it is fed forwardly and the holder so as to wrap the body around the holder at stepped positions along the holder;
   and curing the resin of the body on the holder while the body remains wrapped thereon to form the bar from the cured body;
   wherein the bar consists solely of the body when cured;
   casting a settable material around the turns of the reinforcing bar in a form so as to bury the plurality of turns of the reinforcing bar in the cast material within the form;
   and causing the cast material to set.

2. The method according to claim 1 wherein the wrapping is stopped when the holder is filled by side by side portions of the body arranged along the holder and wherein the resin is cured after the wrapping is stopped.

3. The method according to claim 1 wherein the holder is removed when the wrapping is stopped.

4. The method according to claim 3 wherein the resin is cured with the holder removed.

5. The method according to claim 1 wherein the relative movement between the body and the holder is obtained by indexing the holder along the axis.

6. The method according to claim 1 wherein the holder is driven around the axis at an angular velocity which takes up the body at a constant linear velocity.

7. The method according to claim 1 wherein said at least one helical wrapping comprises first and second helical wrapping or wrappings in opposed direction of wrapping with the resin being permeated through both the inner longitudinally extending components and through the wrappings to form a structure integrated by the permeated resin.

8. The method according to claim 7 wherein the body has an outer surface portion which extends along at least most of the length of the body and at the outer surface portion, the inner longitudinally extending components have parts thereof between the first and second wrapping or wrappings exposed and bulged outwardly by tension applied by the wrapping or wrappings during curing, the bulged parts defining components of the outer surface portion of the bar which are thus rough and exposed for engaging a material to be reinforced so as to transfer longitudinal loads between the material to be reinforced and the inner rovings.

9. A method of reinforcing a cast material comprising:
   forming a helical reinforcing bar so as to provide a plurality of turns of the helical coil by a method comprising:
   forming an elongate body from longitudinally extending components of reinforcing fibers with the components arranged generally longitudinal to the body which is fed forwardly along its length;
   wherein the body comprises a series of inner longitudinally extending components of reinforcing fibers arranged longitudinal to the bar and at least one helical wrapping of at least one component wrapped around the inner longitudinally extending components;
   wetting the elongate body with a unset curable resin permeated through the fibers of the components;
   providing a holder for receiving a length of the elongate body;
   the holder including a continuous helical support channel arranged around a longitudinal axis of the holder;
   while the resin remains unset, rotating the holder about the longitudinal axis so as to wrap the body around the holder and to lay the body into the continuous helical support channel;
   providing relative movement in a direction longitudinal of the axis of the holder between the body as it is fed forwardly and the holder so as to wrap the body around the holder into the continuous helical support channel;
   and curing the resin of the body on the holder while the body remains wrapped thereon to form the helical reinforcing bar from the cured body;
   wherein the helical reinforcing bar consists solely of the body when cured;
   casting a settable material around the helical reinforcing bar in a form so as to bury the plurality of turns of the helical reinforcing bar in the cast material within the form;
   and causing the cast material to set.

10. The method according to claim 9 wherein the helical reinforcing bar is stretched longitudinally along the axis so as to increase the pitch thereof prior to embedding into a receiving material as a reinforcement therefor.

11. The method according to claim 10 wherein the continuous helical support channel is arranged with a pitch substantially equal to a diameter of the body so that the turns of the body are laid side by side.

12. The method according to claim 10 wherein the stretched helical reinforcing bar is connected to longitudinal support bars to hold the helical reinforcing bar in the stretched position thereof.

13. The method according to claim 9 wherein the wrapping is stopped when the holder is filled by side by side portions of the body arranged along the holder and wherein the resin is cured after the wrapping is stopped.

14. The method according to claim 9 wherein the holder is removed when the wrapping is stopped.

15. The method according to claim 14 wherein the resin is cured with the holder removed.

16. The method according to claim 9 wherein the relative movement between the body and the holder is obtained by indexing the holder along the axis.

17. The method according to claim 9 wherein the holder is driven around the axis at an angular velocity which takes up the body at a constant linear velocity.

18. The method according to claim 9 wherein said at least one helical wrapping comprises first and second helical wrapping or wrappings in opposed direction of wrapping with the resin being permeated through both the inner longitudinally extending components and through the wrappings to form a structure integrated by the permeated resin.

19. The method according to claim 18 wherein the body has an outer surface portion which extends along at least most of the length of the body and at the outer surface portion, the inner longitudinally extending components have parts thereof between the first and second wrapping or wrappings exposed and bulged outwardly by tension applied by the wrapping or wrappings during curing, the bulged parts defining components of the outer surface portion of the bar which are thus rough and exposed for engaging a material to be reinforced so as to transfer longitudinal loads between the material to be reinforced and the inner rovings.

20. The method according to claim 9 wherein the helical reinforcing bar is stretched longitudinally along the axis so as to increase the pitch thereof prior to burying in the cast material.

21. The method according to claim 20 wherein the stretched helical reinforcing bar is connected to longitudinal support bars to hold the helical reinforcing bar in the stretched position thereof.

* * * * *